UNITED STATES PATENT OFFICE.

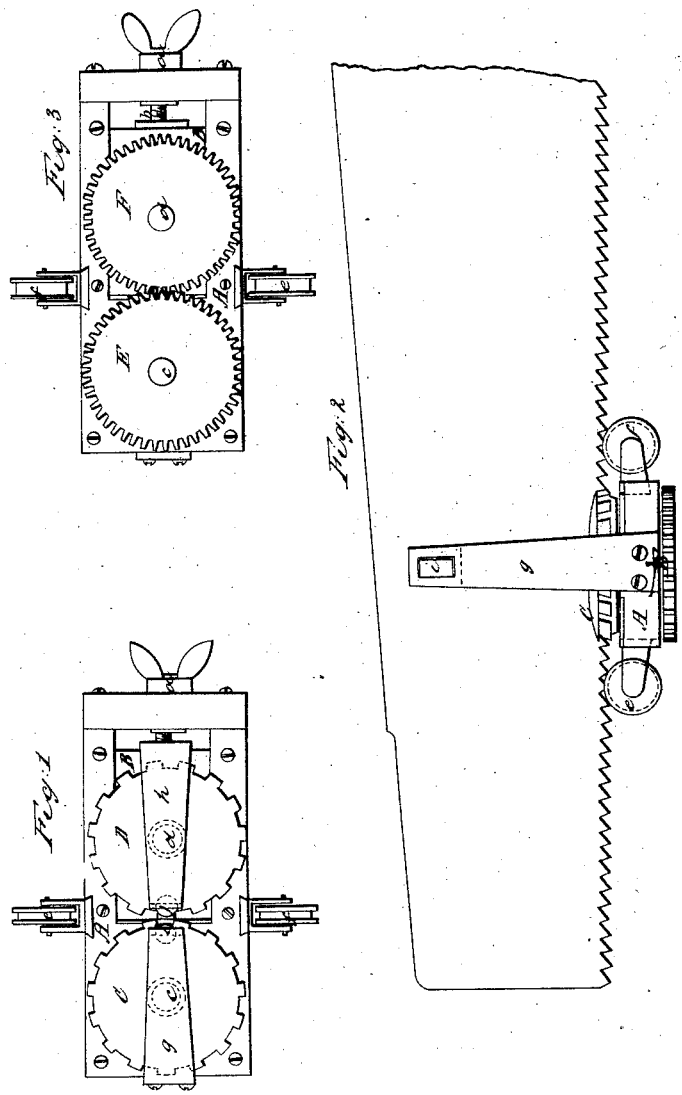

ASA L. CARRIER, OF WASHINGTON, DISTRICT OF COLUMBIA.

SAW-SET.

Specification of Letters Patent No. 28,252, dated May 15, 1860.

*To all whom it may concern:*

Be it known that I, ASA L. CARRIER, of the city and county of Washington, in the District of Columbia, have invented new and useful Improvements in Rotary Saw-Sets; and the following is a clear and exact description of the same, reference being had to the accompanying drawings, making a part of this specification, in which—

Figure 1, represents a top view. Fig. 2, shows an end elevation. Fig. 3, shows the underside.

The nature of my invention consists in the construction and arrangement of rotating punches, and their corresponding matrices so that saw teeth, may be given any required degree of set, in the most perfect manner, by once passing the saw from heel to point.

To enable others skilled in the art, to make and use my invention, I will proceed to describe it, referring to the drawings, and the letters marked thereon.

I construct the plate, or frame (A,) of any desired material metal, or wood, into which a slide (B,) is fitted and made adjustable by a thumb-screw (a.) On the top of the plate (A,) and the slide (B,) are arranged two metal wheels (C,) and (D,) turning on arbors (c) and (d) which have their bearings in the plate and slide (A,) and (B,). On the ends of the arbors underneath are spur-gear wheels (E) and (F) for the purpose of insuring a simultaneous motion to both of the rotating punches, so as to prevent one leading the other and thereby endanger the saw teeth.

The metal wheels, (C,) and (D) are made of steel, or iron, case hardened, the edges being spaced so as to form alternate punches, and matrices, according to the fineness of the teeth of the saw, the projecting parts or punches are beveled to give the angle of the set, and are compressed by the action of the thumb screw (a, b,) and slide (B) to accommodate the thickness of the blade, and also give the required set.

On each side of the punches (C and D,) and in a line at a right angle of the edges, are adjustable gage rollers (e) and (f) to designate the portion of the tooth to be bent in setting. The rollers (e) and (f) may be made of soft copper, or other soft metal that will not mar the points of the teeth, or wood, covered with india rubber or leather, their function being to keep the edge of the saw in a straight line.

To the plate (A) and slide (B) are secured two upright posts or pieces (g,) and (h) the cap or part bent over so as to come near together. In the ends of each is a vertical roller (i and j). These being adjustable with the punch wheels (D) serve as a guide to keep the saw blade precisely at a right angle with the rotating punches and thereby the saw is set without a hair's breadth variation.

In the latest and best method of manufacturing saws, the teeth are cut by machinery, so that they are accurately spaced off, so many to the inch, and have not the slightest variation, and it will readily be seen, that by my invention the setting can be done as perfectly, and in no other way.

To operate: Secure the machine to a bench, adjust the parts to give the right set, place the first teeth to match the punch and its corresponding matrix, press it down till it touches the roller (e and f) and keeping it to slightly bear on the points of the teeth, draw the saw from end to end, and it will be set in the most perfect manner. Bur or circular saws, may be set in the same manner by their being hung on the center, at the proper distance to bring the teeth in contact with the rotating punches.

The only change necessary to set saws of different grades, coarse or fine teeth, is to substitute punch rollers having spaces to correspond with the size of the teeth. Another important end is obtained by my invention; that is, there can be no bruising or marring of the teeth, neither will the plate be strained, or bent, as is often the case in setting by other modes.

Having thus fully described my invention, and mode of operation, what I claim as new, and desire to secure by Letters Patent is—

1. The construction, and arrangement of a series of rotating punches, and their corresponding matrices, working together, to set the teeth of saws, alternately to the right and left at the same time, thereby completing the operation by passing it once through the machine.

2. I claim the upright guides, the adjustable slide (B,) to regulate the degree of set in saws, in combination with the rotating punches—as described for the purposes specified.

A. L. CARRIER.

Witnesses:
EDM F. BROWN,
J. B. WOODRUFF.